April 4, 1961 C. E. HENRION 2,978,222
BUTTERFLY OR LIKE VALVES
Filed March 12, 1958
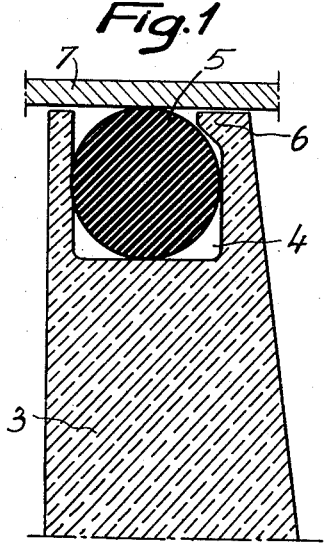
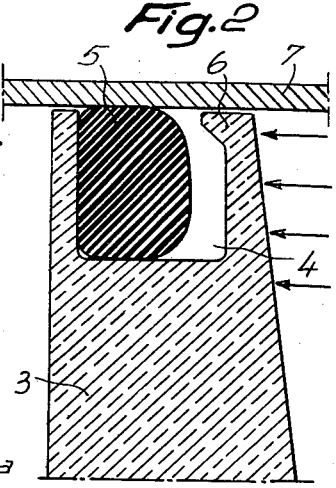
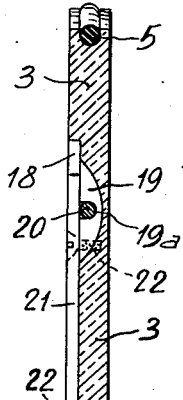
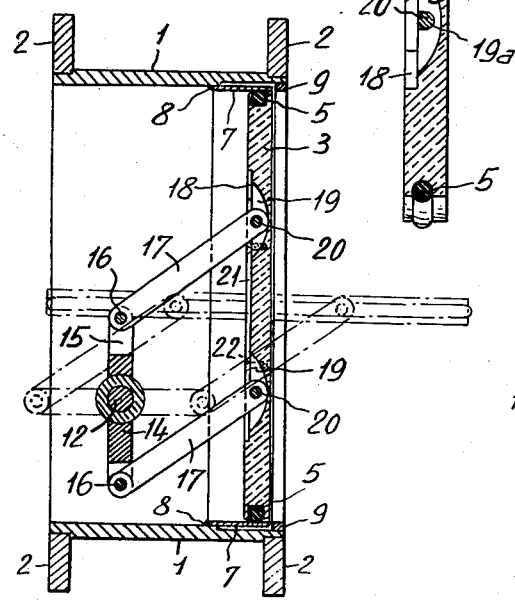
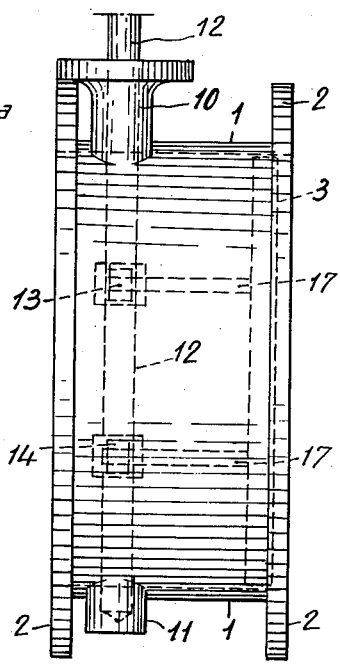

United States Patent Office 2,978,222
Patented Apr. 4, 1961

2,978,222

BUTTERFLY OR LIKE VALVES

Charles Emile Henrion, Rue du Pont de Pierre,
Essey-les-Nancy, France

Filed Mar. 12, 1958, Ser. No. 720,940

Claims priority, application France Apr. 11, 1957

4 Claims. (Cl. 251—173)

The present invention relates to improvements in butterfly valves or the like, in which the shaft around which the butterfly may rotate does not meet the contact line, or surface, along which the periphery of the butterfly comes into engagement with the inner surface of the valve body, so that such surface of contact is unbroken and the tightness of the valve is notably improved.

In accordance with the invention, the periphery of the butterfly is provided with a fluid-tight fitting which is also unbroken and the axis around which the butterfly rotates is a virtual axis designed in such a way that it does not interrupt the continuity of the line of contact.

The fluid-tight fitting consists of a groove formed along the whole periphery of the butterfly and an unbroken packing which is lodged in the groove and is in the form of a circular ring of natural or synthetic rubber, "Teflon," or a convenient plastic material having a suitable elasticity and which is not subject to attack by the fluid which passes through the butterfly valve.

The dimensions of the groove and of the circular ring, as well as the shape of the groove, are chosen so that, when the butterfly is in closed position, the shape of the resilient ring is altered by the pressure of the fluid and is pressed radially against a sleeve of stainless, polished steel which is preferably disposed against the inner surface of the valve body and thereby forms a tight packing by means of which a difference of pressure may be maintained between the opposite faces of the butterfly.

A specific embodiment of the invention is hereinafter described in detail, with reference to the accompanying drawing and only by way of example, in order to permit the invention to be better understood.

In the drawing:

Fig. 1 is a radial sectional view of the fluid tight packing at the periphery of the butterfly, Fig. 2 is a similar view, but showing the packing ring deformed by the fluid pressure, Fig. 3 is a transverse sectional view of the butterfly in a plane perpendicular to the vertical axis of rotation thereof, Fig. 4 is an axial sectional view of a butterfly valve embodying the invention, and Fig. 5 is a side elevation view of the valve of Fig. 4.

Referring to the drawing in detail, it will be seen that the valve embodying the present invention comprises a cylindrical valve body 1 provided with coupling flanges 2 at its opposite ends, and a butterfly valve 3, which may rotate around a virtual axis, as will be explained hereinafter.

The butterfly valve 3 has a radially outward opening groove 4 along its entire periphery and in which a circular ring 5 is lodged, the groove 4 being narrower at its opening than at its bottom.

In the illustrated embodiment of the invention, this narrowing is obtained by a rim or flange-like part 6 projecting axially from the side of the groove disposed closest to the side of the butterfly valve against which the pressure of the fluid acts.

The dimensions of the opening of the groove and of the ring are chosen so that the opening is narrower than the diameter of the ring, for which reason the latter must be forced through the opening in order to be positioned in the groove.

The circular ring 5 consists of a resilient material, such as, natural or synthetic rubber, "Teflon," or other convenient plastic materials having suitable elasticity and sufficient stiffness and which are not susceptible to damage by the fluid flowing through the valve. As already mentioned the projecting edge or rim 6 of the groove is disposed on the side where the fluid pressure acts when the valve is in closed position. The pressure then acts against the circular ring, and deforms the latter by pressing it against the wall of the groove which is opposed to the projecting edge 6 and against an inner lining of the corresponding part of the valve body. Such inner lining preferably consists of a sleeve 7 of stainless metal.

The sleeve 7 is secured in the valve body at its side opposed to the arrival of the fluid, either by welding or by having a force fit within the valve body. Preferably, as shown in Fig. 4, the inner surface of valve body 1 is counterbored along most of the length of sleeve 7 so that, with the exception of the portion of sleeve 7 secured to body 1, an annular clearance is provided between sleeve 7 and body 1.

When sleeve 7 has been secured, the device is completed by the introduction of a ring 9 which is flush with the end edge of body 1 at the inlet of the latter. Sleeve 7 is slightly resilient and, when the butterfly-valve is in closed position, the fluid pressure acts in the annular clearance between body 1 and sleeve 7 and tends to tighten the latter against the periphery of the butterfly-valve.

It is obvious that the circular ring 5, when it is deformed by the fluid pressure, forms a tight and unbroken packing along the whole circumference of the butterfly.

On the other hand, owing to the peculiar shape of the groove, the circular ring cannot be inadvertently removed from the groove, when the butterfly-valve is in opened position, and the section of the valve body which was previously shut by the butterfly valve is then strongly swept by the fluid flowing at high speed through the valve body.

It is obvious that, in order to have an unbroken surface between the periphery of the butterfly and the line along which the butterfly is tightly applied against the inner wall of the valve body, the butterfly cannot be rotatably mounted on a shaft which cuts through this surface, and, in accordance with the present invention, the butterfly valve 3 is rotatably mounted on a virtual or imaginary axis.

In order to mount the valve 3, the valve body 1 is provided with two projections 10 and 11 positioned symmetrically with respect to the diameter of the valve body perpendicular to a hereinafter mentioned driving shaft, and which are internally bored, so that they can serve as bearings for a shaft 12, which is utilized as the driving shaft of the butterfly as will be explained below.

It is understood that bearing 10 is preferably provided with a stuffing or packing box, not shown in the drawings.

On shaft 12 are mounted at least two cross-bars or connecting links 13 and 14 which are parallel to each other and disposed in a plane parallel to that of the butterfly-valve. The connecting-links 13 and 14 are perpendicular to shaft 12 which is at the midpoints of the connecting-links and the latter have bifurcated ends 15 in which coupling rods 17 may rotate about pivot pins 16 engaged in apertures bored in the bifurcated ends of the cross-bars or connecting links. The opposite ends of the coupling-rods are hinged to the butterfly valve 3, For this purpose, the butterfly-valve has, in its face directed towards the driving shaft, parallel grooves 18, each of which corresponds to a pair of coupling rods. The bottom of each groove 18 is provided with two additional recesses 19 and hollows 19a for receiving axles 20 upon which ends of the coupling-rods 17 are mounted, so that the coupling-rods can rotate with respect to the butterfly 3. The axles 20 are kept in the respective hollows 19a by means of counter-plates 21 which are held in the grooves 18 of the butterfly-valve by means of screws 22 (Fig. 3). As shown in Fig. 3, the axes of the pins or axles 20 coincide with a plane of the valve member.

The distances between the axles 20, by which the coupling-rods are pivotally connected to the butterfly-valve, are the same as the distance between the pivot pins 16 disposed at the opposite ends of the coupling rods, so that the four coupling-rods 17 form an articulated parallelepiped, and the plane of the butterfly always remains parallel to the plane formed by the shaft 12 and the cross-bars or connecting links 13, 14, mounted on the latter.

It is obvious that, with the butterfly-valve initially in its closed position, as shown on Figs. 4 and 5, it will be sufficient to turn the valve through 90 degrees in the counterclockwise direction to bring the butterfly-valve to its open position parallel to the axis of the valve body. It is to be noted that, in order to permit full opening of the valve 3, the driving shaft 12 must be spaced from the median plane of the valve body 1, as is obvious in Fig. 4.

It is also obvious that the distance between the driving shaft 12 and the virtual axis of the butterfly valve 3 will not change during opening and closing of the latter and that the virtual axis will always remain practically in the same position by reason of the fact that the diameter of the circular valve 3 is substantially equal to the inner diameter of valve body 1.

The forces acting on the butterfly valve in its wholly or partially closed position by reason of the pressure of the fluid flowing through the valve, will be fully supported by the driving shaft 12 to which the forces will be transmitted by means of the coupling rods 17 and the cross bars 13 and 14.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claims.

What I claim is:

1. A butterfly valve comprising a cylindrical valve body, a circular valve member in said valve body and adapted to obstruct flow through said body when said valve member is in a closed position lying in a plane perpendicular to the axis of said cylindrical valve body, a straight operating shaft extending across said valve body perpendicular to said axis and rotatably journalled in said valve body, cross bar means mounted centrally on said shaft and extending diametrically with respect to the axis of the operating shaft, at least one pair of equal lengths coupling rods for said cross bar means, pivot pins extending parallel to the axis of said shaft at the opposite ends of each cross-bar and pivotally connecting the related pair of coupling rods to the cross-bar means at one end of each coupling rod, and means located in a plane of the valve member pivotally connecting the other ends of said coupling rods to said circular valve member at locations which, for each pair of coupling rods, are spaced from a diametrical medial line of the circular valve member by distances equal to the radial distance from the axis of said operating shaft to each of said pivot pins so that, in every position of said cross bar means during rotation of said operating shaft, the plane of said valve member is maintained parallel to a plane passing through said axis of the operating shaft and said pivot pins while turning about said diametrical medial line, said axis of the operating shaft being spaced from said axis of the cylindrical valve body so that said valve member can be moved about said diametrical medial line to a fully open position lying in a plane containing said axis of the body without interference from said cross bar means and coupling rods.

2. A butterfly valve as in claim 1; wherein said means pivotally connecting the other ends of the coupling rods to the valve member includes a pivot pin received in an aperture at said other end of each coupling rod and extending from the opposite sides of the latter, said valve member having a recess with an arcuate bottom for each coupling rod and receiving said other end of the latter, and hollows at the opposite sides of each recess having the ends of the pivot pin at said other end of the related coupling rod seated therein, and a cover plate removably secured to said valve member and overlying said hollows to retain the related pivot pin therein.

3. A butterfly valve as in claim 1; wherein said circular valve member has a groove extending along the entire periphery thereof and opening radially outward through an annular slot, said valve member having an integral annular projection at one side of said slot to reduce the width of the latter, and a sealing ring of elastic material having a normally circular cross-section with the diameter of the latter being greater than said reduced width of said slot of the groove, said sealing ring being disposed in said groove and reaching through said slot to prevent leakage past said valve member when the latter is in its closed position, said projection being spaced from the surface of said sealing ring so that, when said valve member is in its closed position, the pressure of fluid acting against one side of the valve member can enter between said projection and sealing ring and act in said groove to deform the sealing ring and thereby urge the latter into intimate sealing engagement with said valve body.

4. A butterfly valve as in claim 1; wherein said circular valve member has a groove extending along the entire periphery thereof and opening radially outward; and further comprising a sealing ring of elastic material seated in said groove and projecting from the latter, and a radially uninterrupted, one-piece resilient sleeve fixed in said valve body and spaced radially inward from the interior surface of the valve body over a substantial portion of the length of said sleeve so that, when said valve member is in its closed position, the pressure of fluid acting against said valve member can also act between said interior surface of the valve body and said sleeve to urge the latter radially inward into intimate sealing contact with said sealing ring.

References Cited in the file of this patent

UNITED STATES PATENTS

| | | |
|---|---|---|
| 1,014,775 | Rothchild | Jan. 16, 1912 |
| 2,059,656 | Ring | Nov. 3, 1936 |
| 2,299,865 | Whitted | Oct. 27, 1942 |
| 2,673,708 | Danks | Mar. 30, 1954 |
| 2,791,396 | Reppert | May 7, 1957 |
| 2,825,528 | Truitt | Mar. 4, 1958 |
| 2,886,062 | Wheatley | May 12, 1959 |

FOREIGN PATENTS

| | | |
|---|---|---|
| 435,059 | Great Britain | of 1935 |